Figure 1:
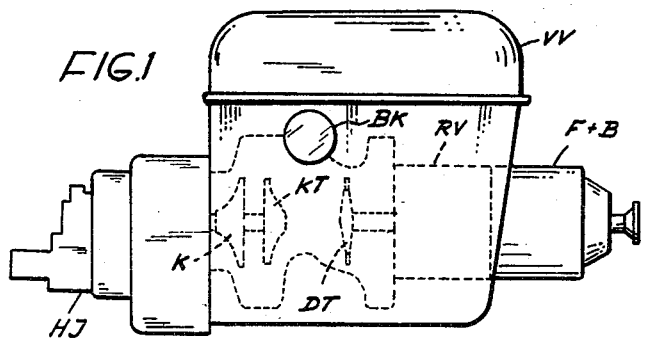

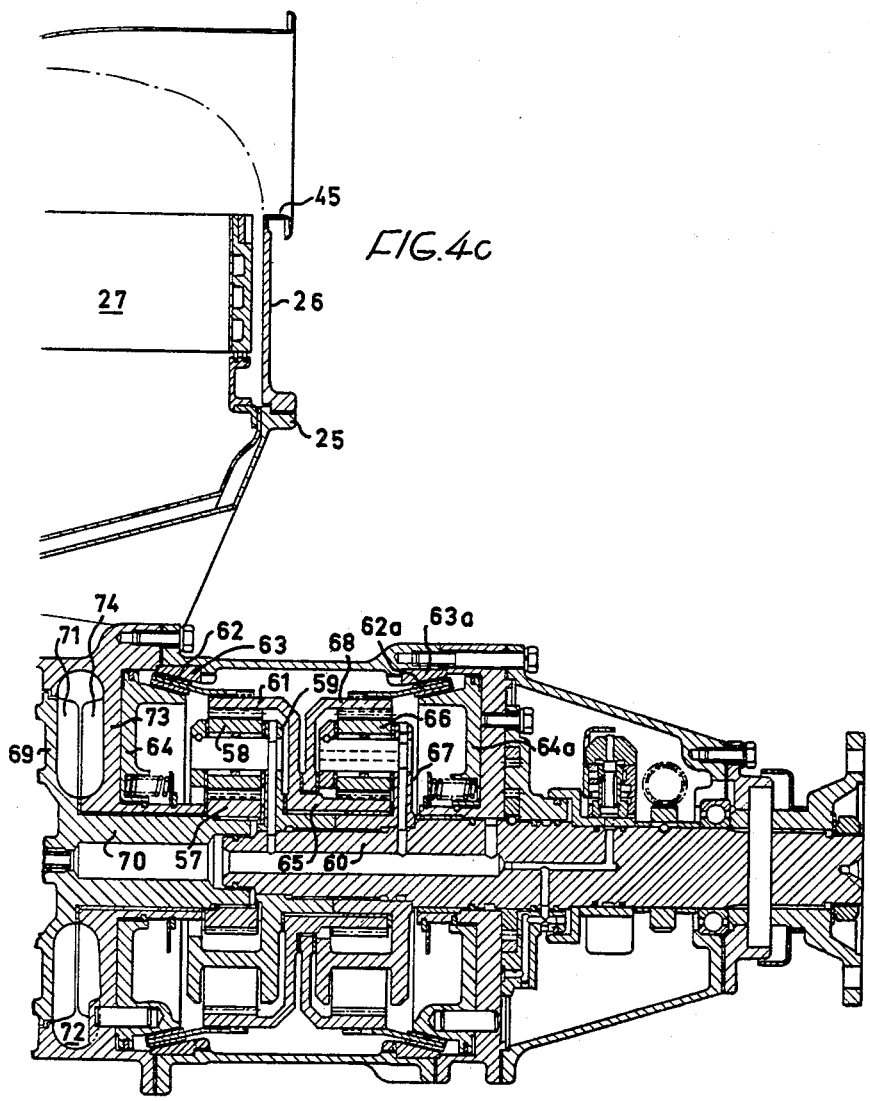

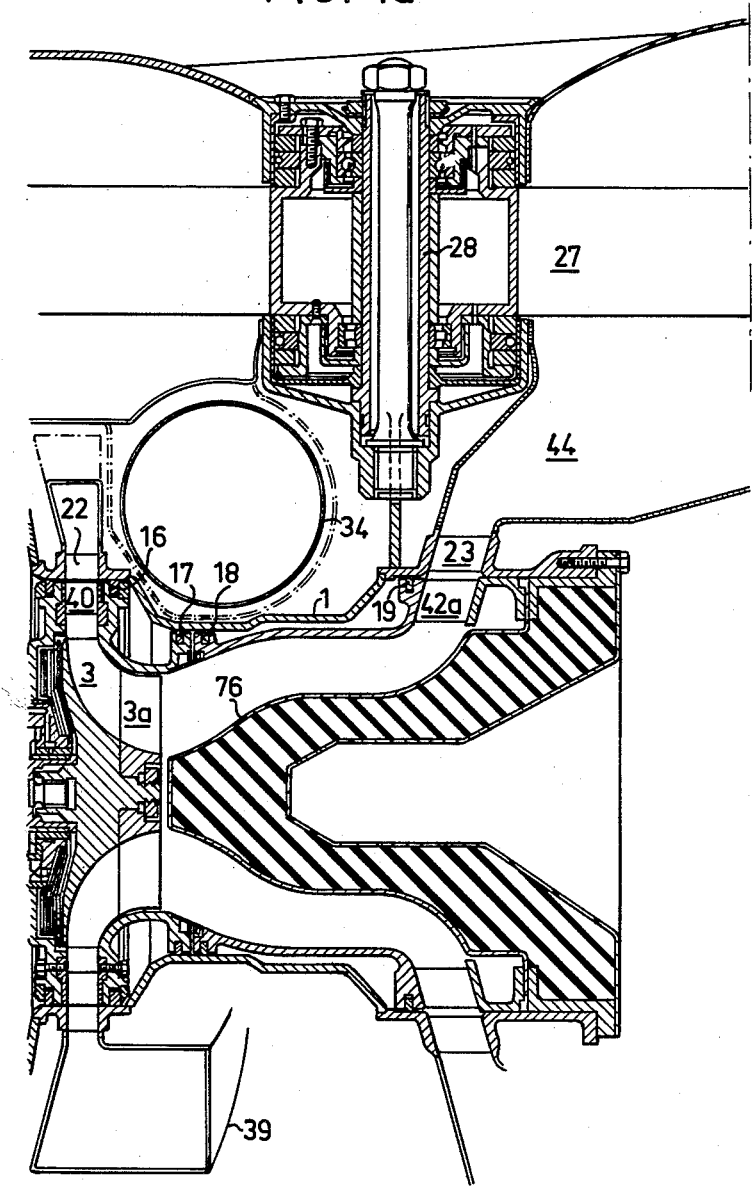

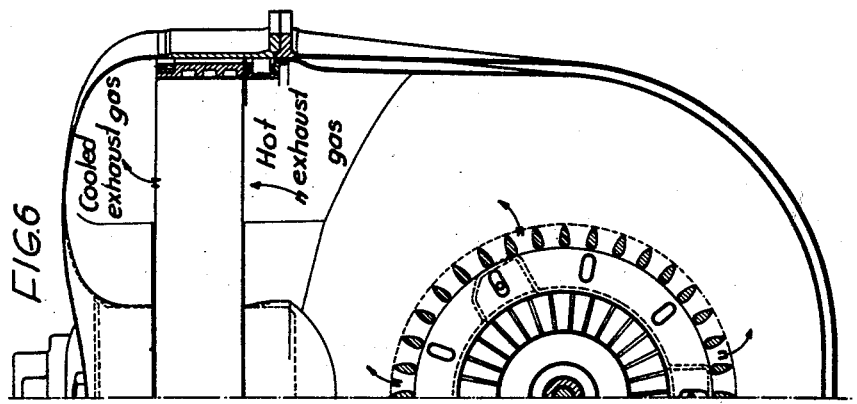
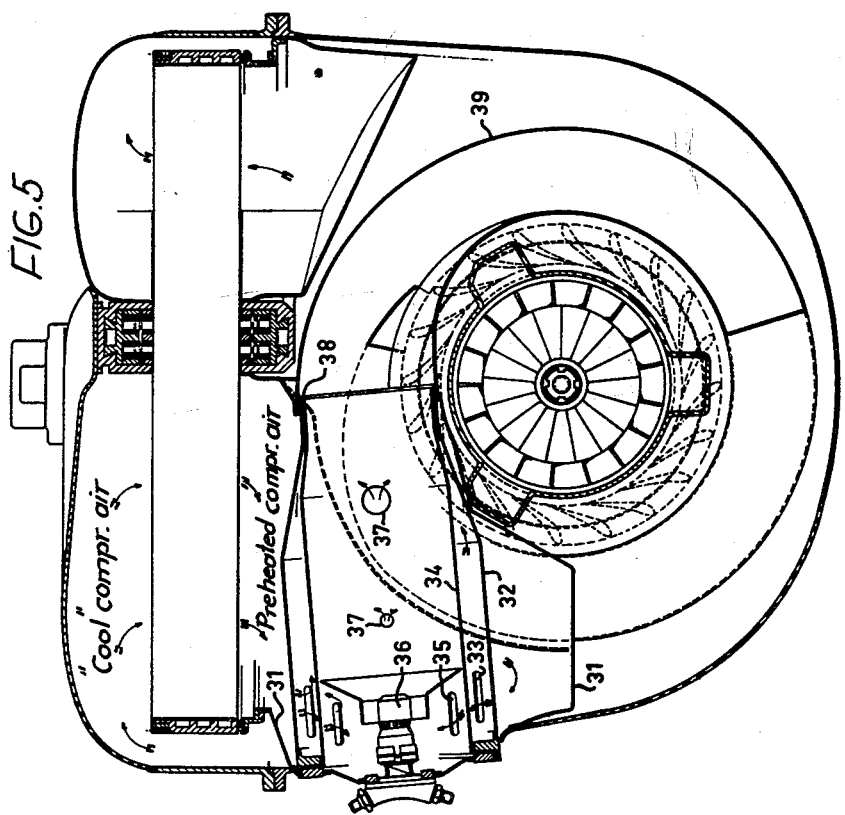

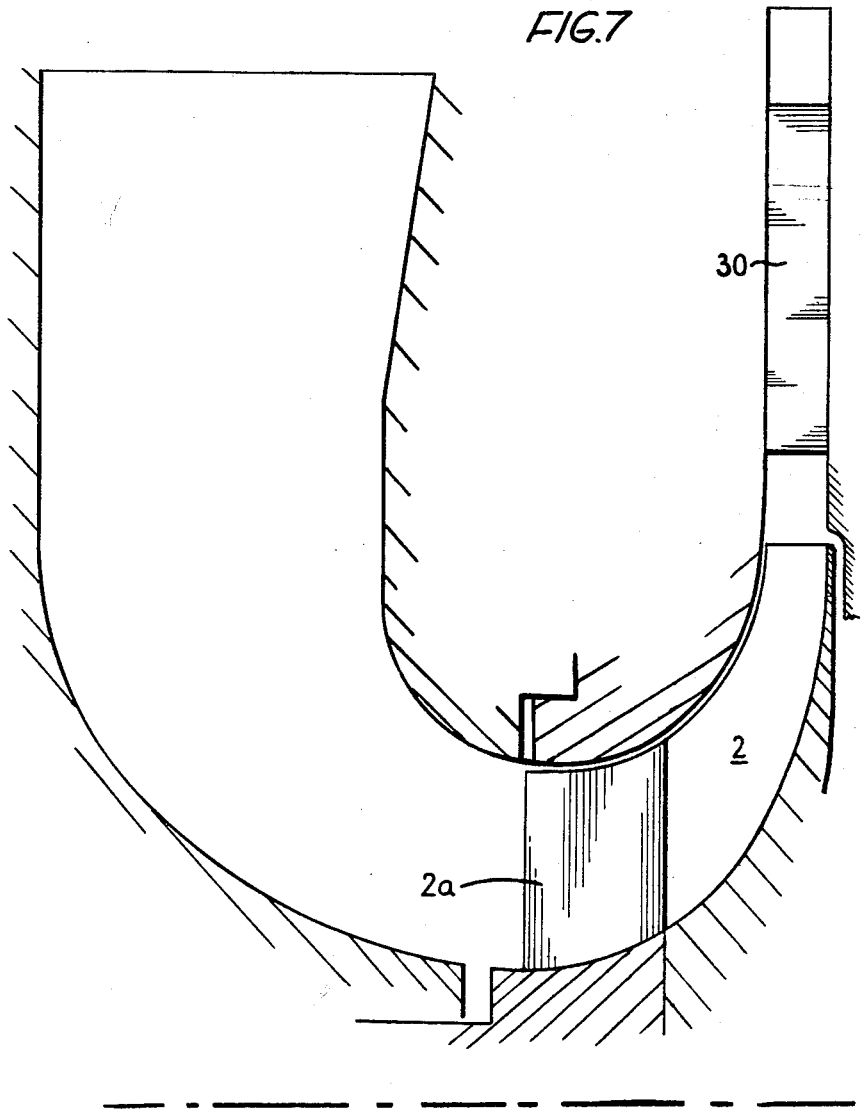

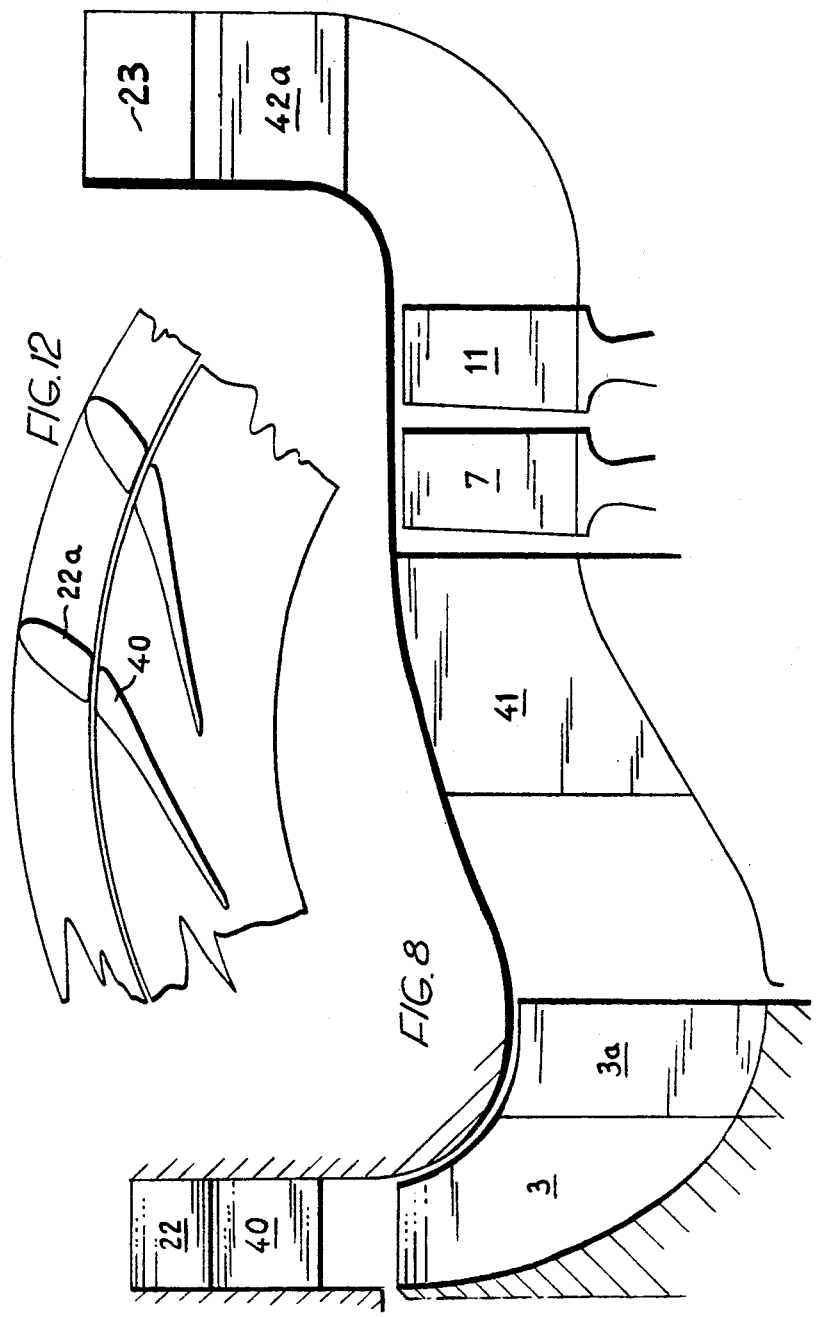

March 16, 1965 SVEN-OLOF KRONOGÅRD 3,173,255
GAS TURBINE PLANT
Filed Feb. 27, 1962 18 Sheets-Sheet 10

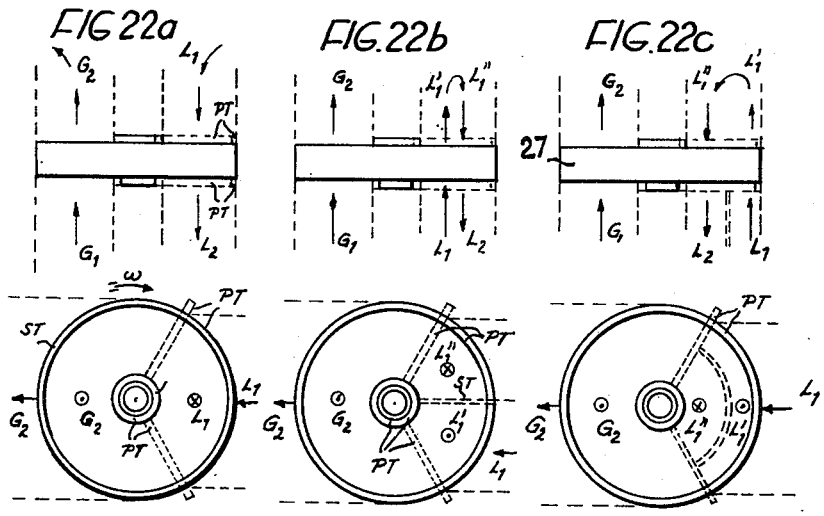
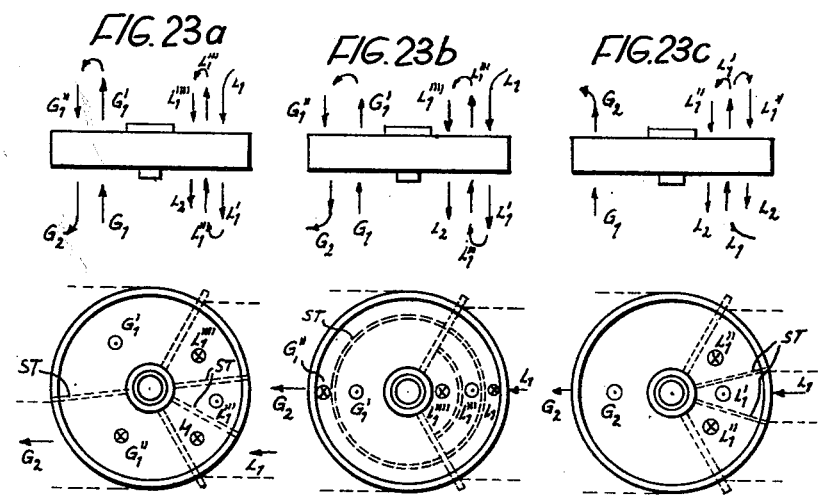

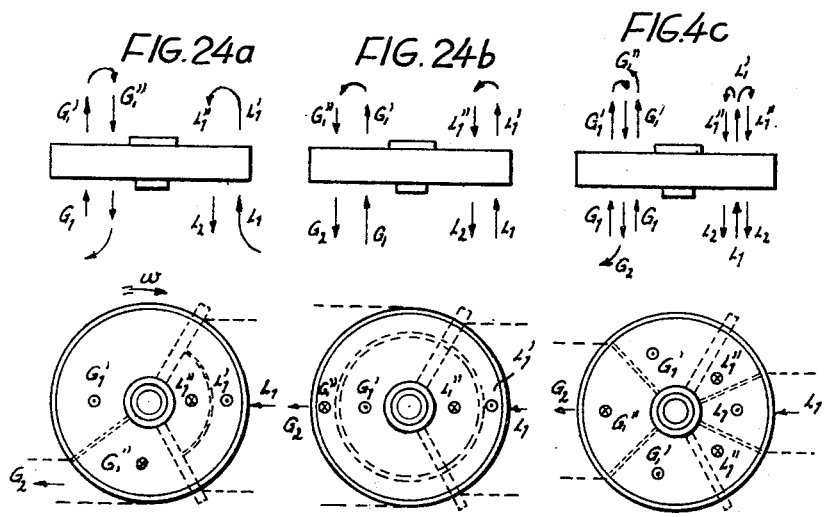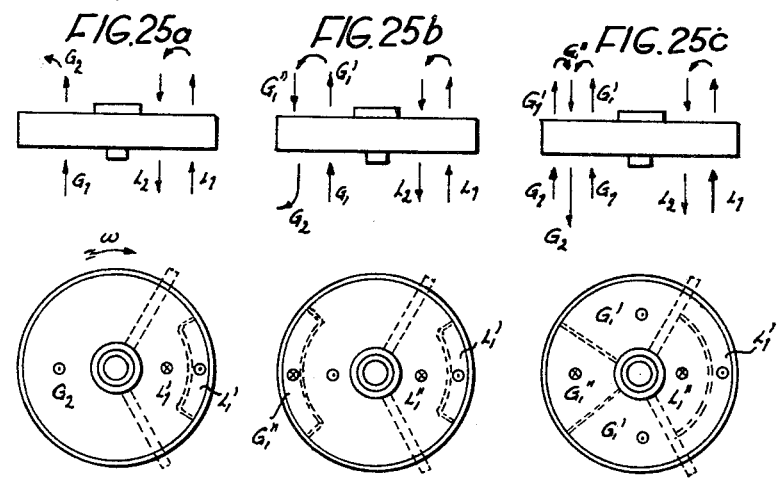

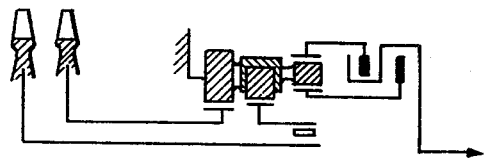
FIG. 26
FIG. 27
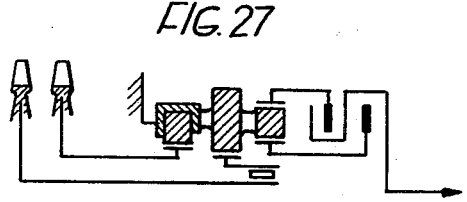
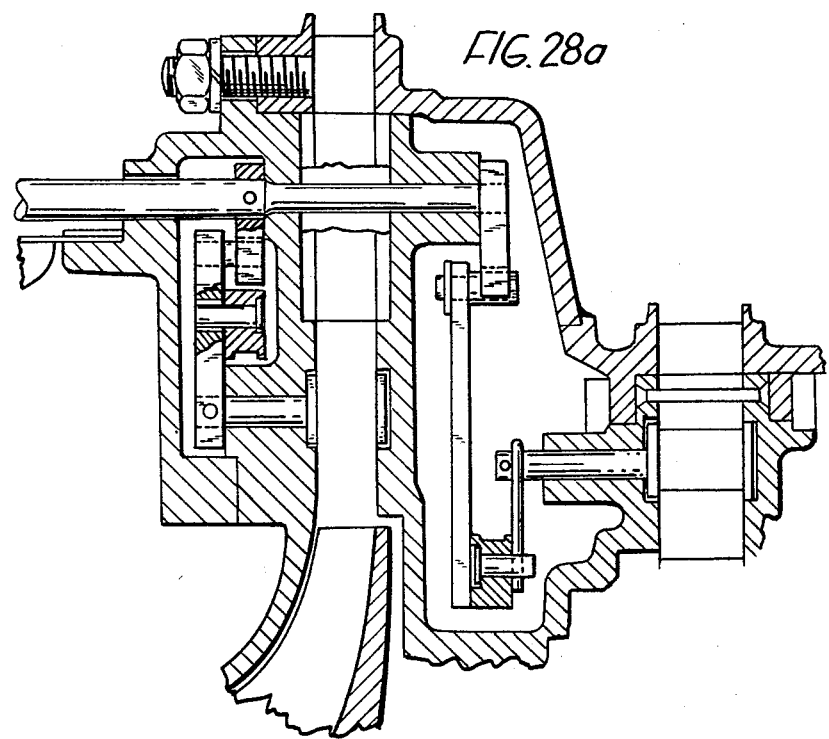
FIG. 28a

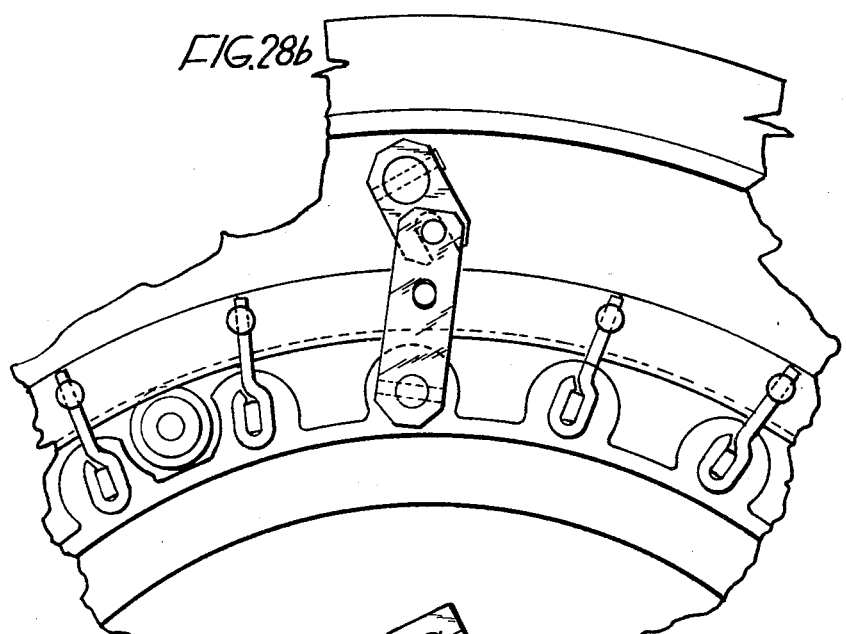
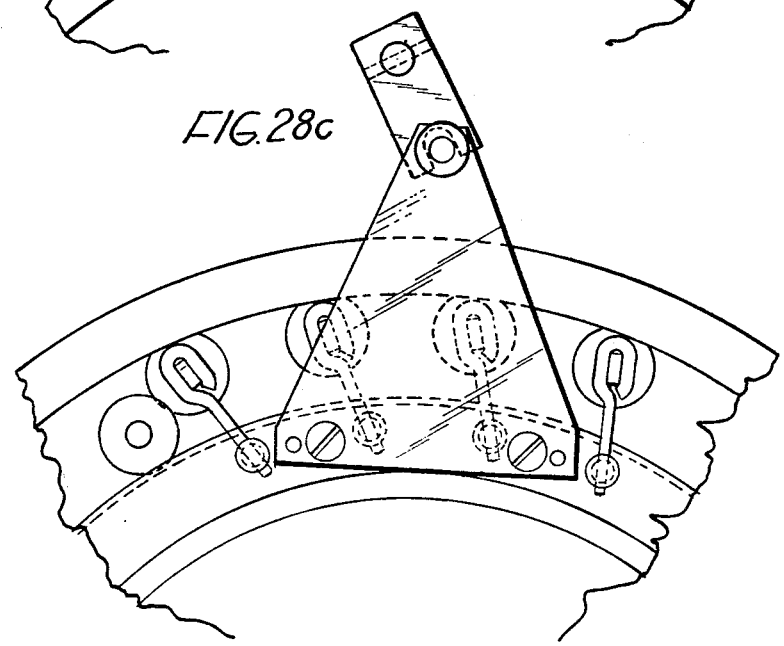

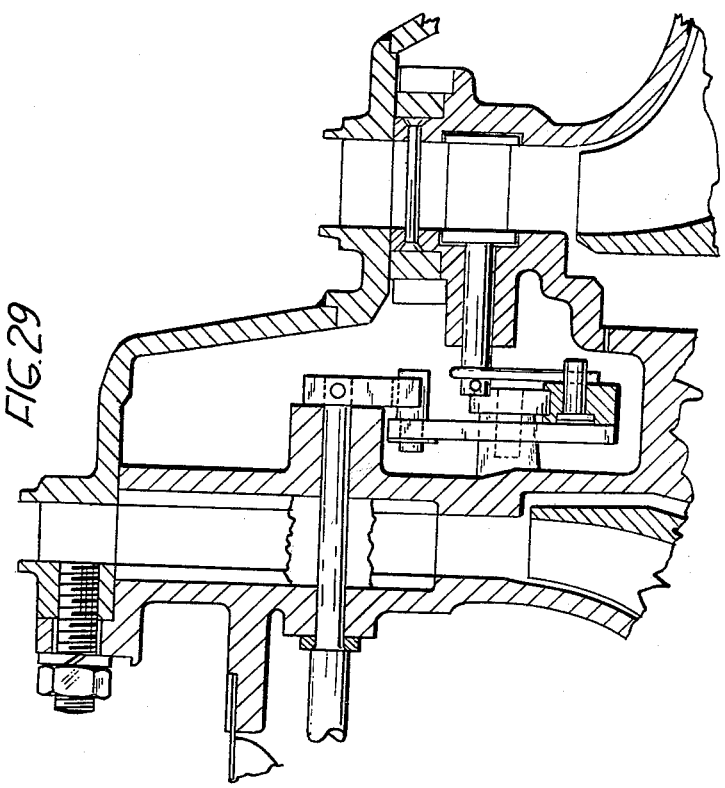
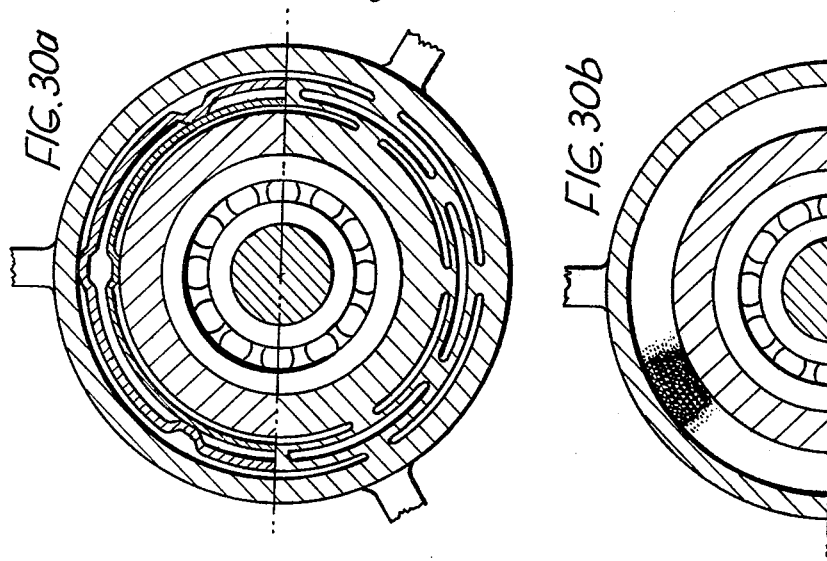

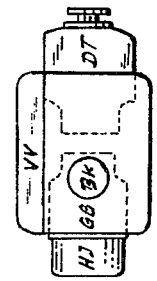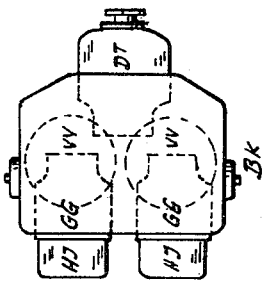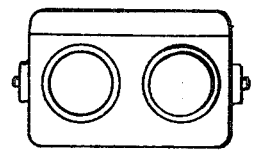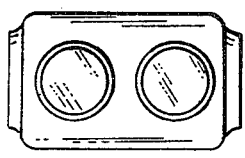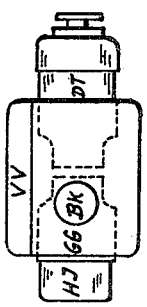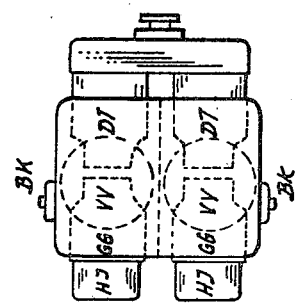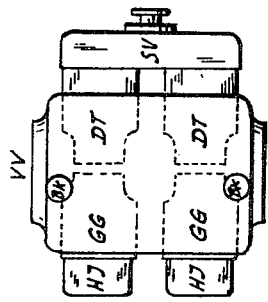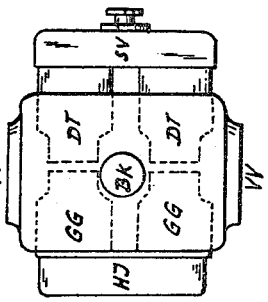

United States Patent Office 3,173,255
Patented Mar. 16, 1965

3,173,255
GAS TURBINE PLANT
Sven-Olof Kronogård, Goteborg, Sweden, assignor to Ab Volvo, Goteborg, Sweden, a corporation of Sweden
Filed Feb. 27, 1962, Ser. No. 176,041
15 Claims. (Cl. 60—39.16)

This invention relates to a gas turbine plant comprising a compressor, a combustion chamber and at least one turbine. Such plants are adapted to be used in various fields of application, such as automotive or stationary power systems. In each field of application there are demands on plants for different powers and designs resulting in that a manufacturer has to meet specifications for a countless number of designs to satisfy all requirements.

The main object of the invention is to rationalize the production of gas turbine plants. To attain this object of the invention, the plant is composed of a few number of units adapted to be combined in different manners according to requirements. In its broadest aspect, the gas turbine plant according to the invention is characterized by the fact that the compressor and the turbine or turbines are housed in a casing which is substantially symmetrical with respect to the axis of rotation and has openings for air discharged from the compressor inlet, openings for the working gases discharged from the combustion chamber, and outlet openings for the working gases expanded in the turbine. With this casing serving as a basic element a variety of different types of gas turbine plants can be composed. The compressor and the turbine or turbines can be housed in the casing in the form of complete units, and the casing has internal guide surfaces for centering the units. A comparatively wide power range and speed range can be covered with otherwise identical units in the plant merely by variation of the shape and number of blades in each set of blades and by variation of the number of turbine stages. In a preferred form of construction the casing is associated with a sheet metal hood the interior of which directly communicates with the openings for the compressed air and in which the combustion chamber is housed, the combustion chamber communicating with an inlet volute of the compressor turbine which volute is provided externally of the gas inlet openings of the casing. This hood, too, is a basic element of the gas turbine plant according to the invention and can be comprised in an unchanged form in a great number of different types of plants. If required, the hood can be combined with a heat exchanger, resulting in further possibilities of variation. The requisite reduction gears, reversing gears, forward gears, backward gears, etc., may be secured to the casing in the form of separate units and combined with each other in any desired manner.

Figure 2:
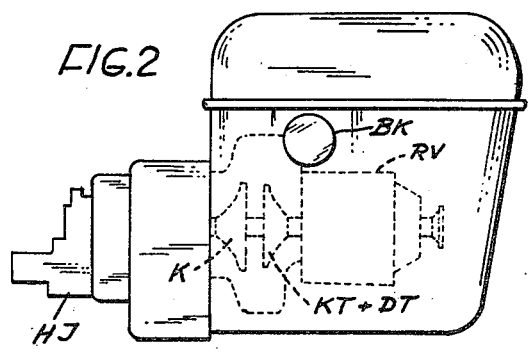
Figure 3:
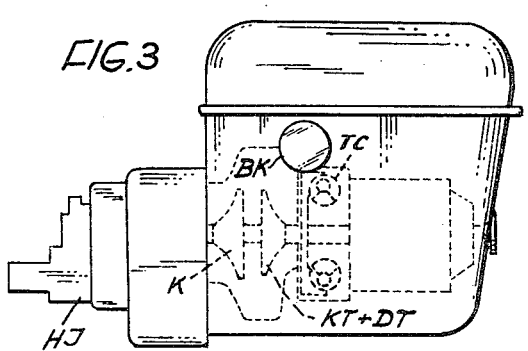
Figure 4A:
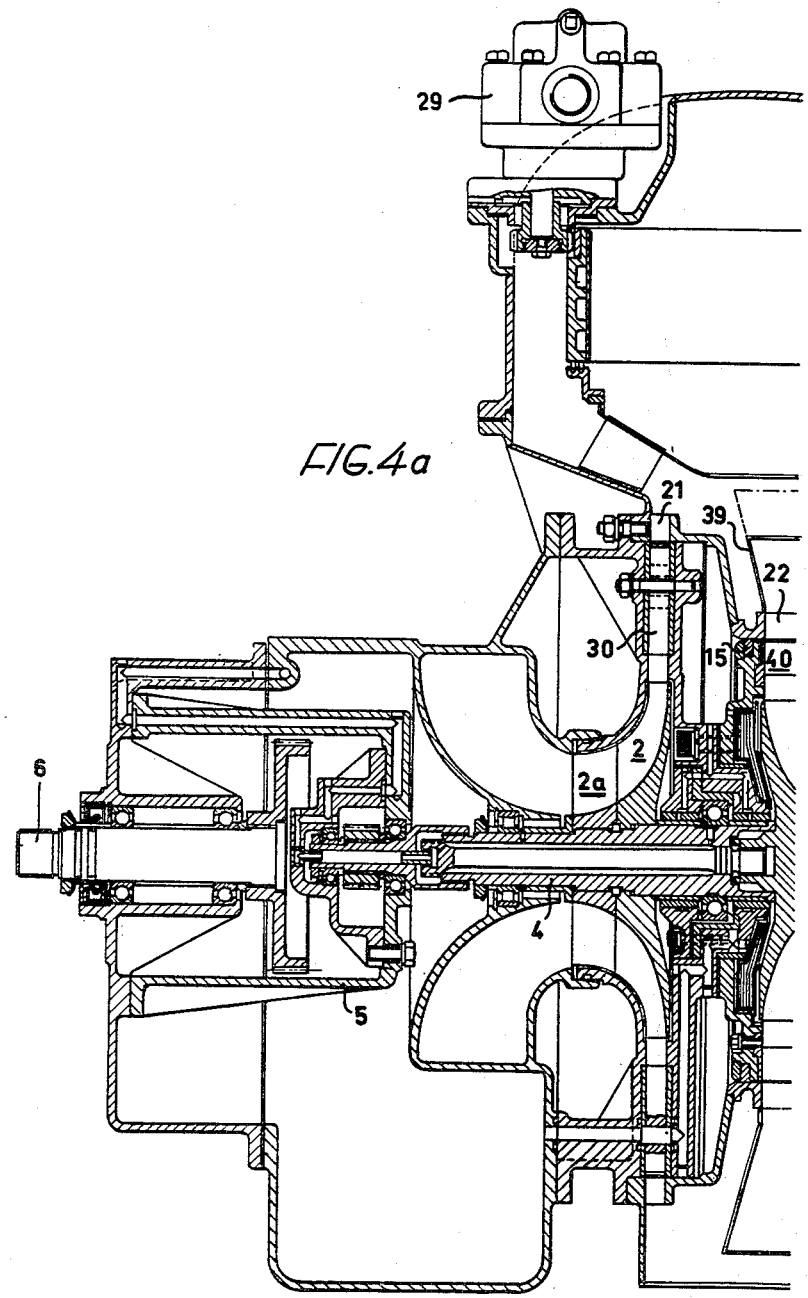
Figure 4B:
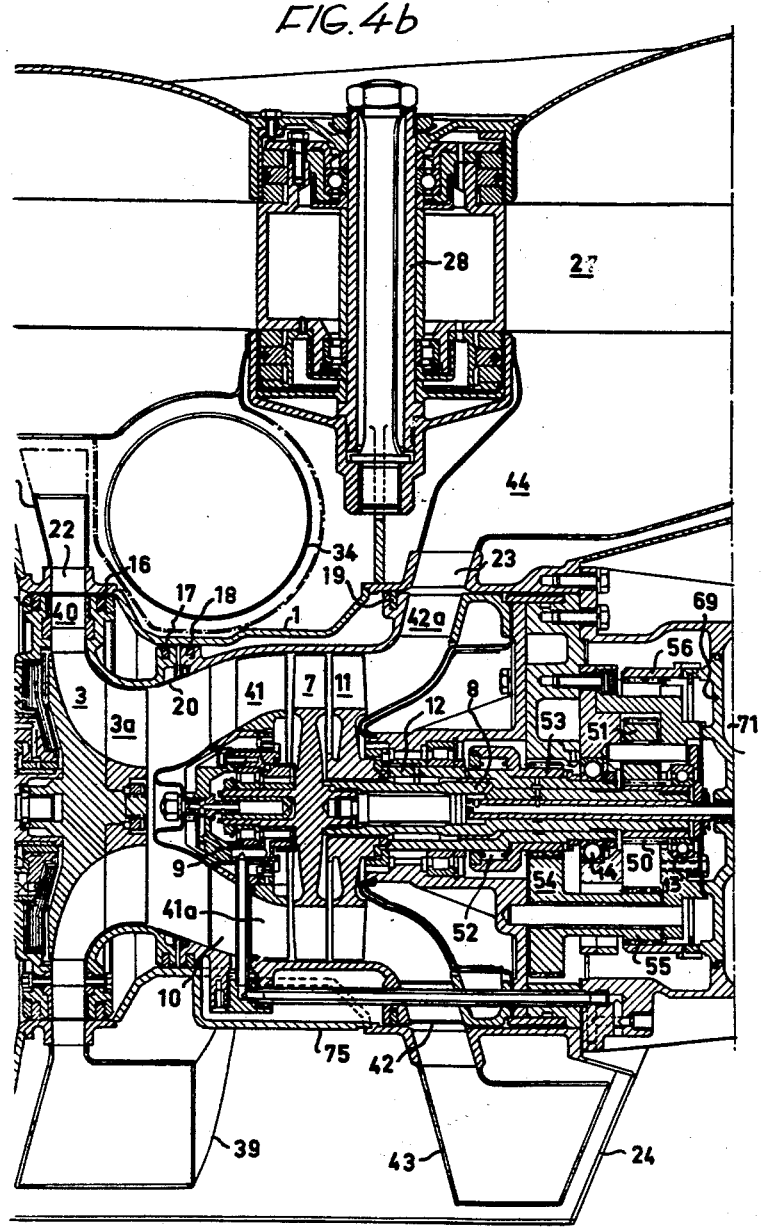
Figure 17:
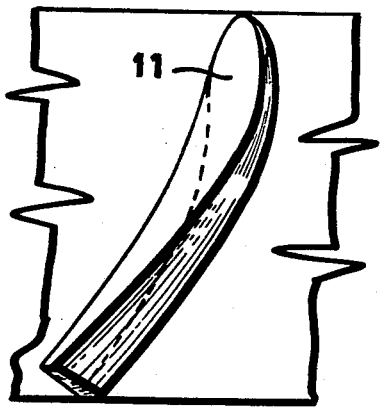
Figure 18:
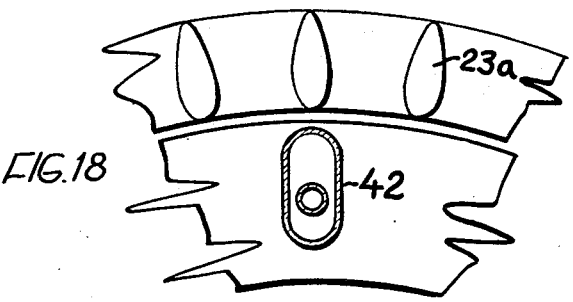
Figure 19:
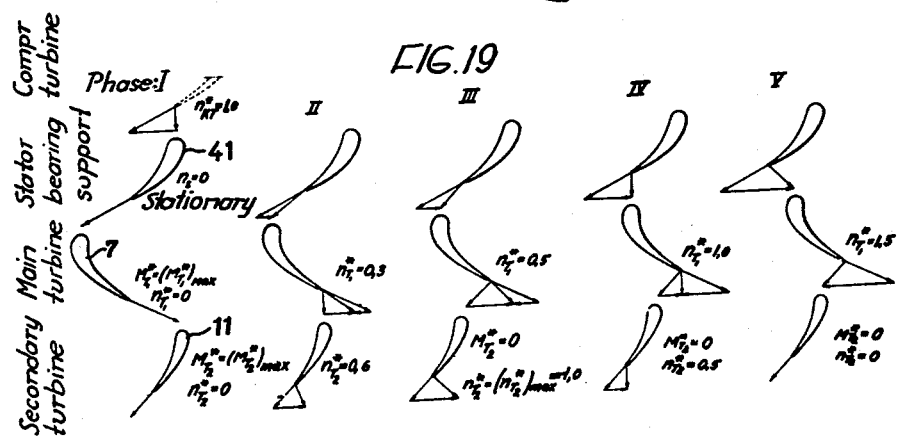
Figure 20:
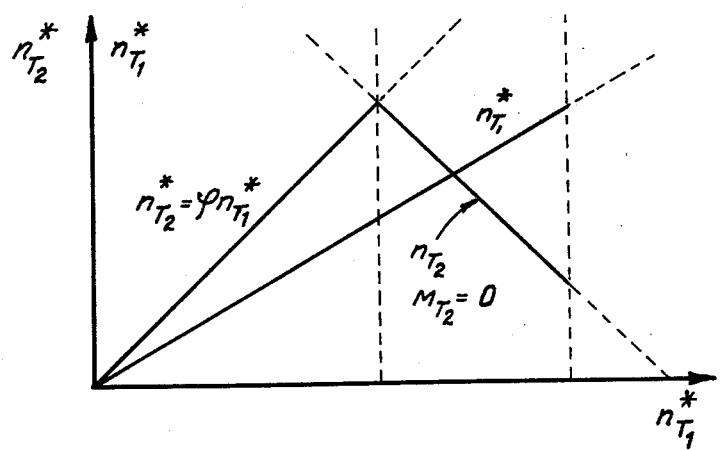
Figure 21:
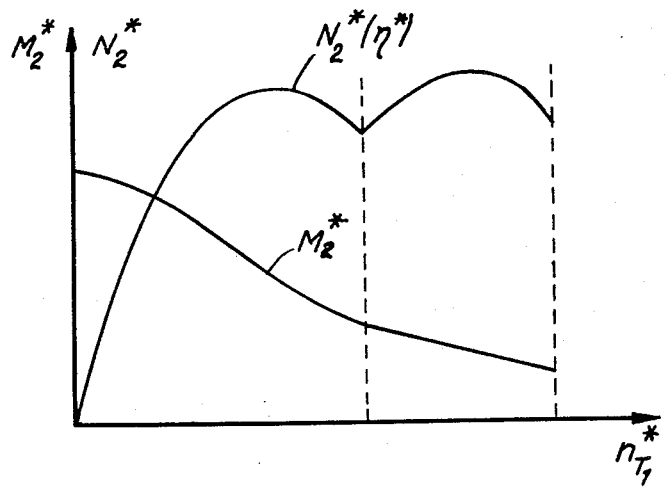

The above object and further objects are attained by mechanism described hereinbelow with reference to the annexed drawing. FIGS. 1-3 are diagrammatic views of three different types of gas turbine plants with and without heat exchangers. FIGS. 4a, 4b and 4c are parts of a longitudinal sectional view of a further embodiment of the gas turbine plane, FIG. 4d is a longitudinal sectional view corresponding generally to FIG. 4b but showing another embodiment of the gas turbine plant, and FIGS. 5 and 6 are two different cross-sectional views of the plant according to FIGS. 4a, b and c. FIGS. 7–18 illustrate the forms of the ducts through the compressor and the turbines as well as the forms of the various blades in the plant according to FIGS. 4a, b and c. FIG. 19 illustrates the velocity diagrams for five different conditions of operation of the useful power turbine of the plant according to FIGS. 4a, b and c. FIGS. 20 and 21 illustrate two diagrams showing the relation between the speed, torque and output of the power turbine. FIGS. 22–25 illustrate three different manners for passing expanded working gases and compressed air through a heat exchanger of the rotary type. FIGS. 26 and 27 (a–f) illustrate two modified constructions of the reduction gear shown in FIG. 4. FIGS. 28a–c and 29 illustrate two embodiments of the compressor system, one embodiment having adjustable guide vanes at the outlet of the compressor and at the inlet of the compressor turbine, and the other embodiment having adjustable guide vanes merely at the inlet of the compressor turbine. FIGS. 30a and b illustrate different embodiments of a detail of the bearing structure for the power turbine of the plant according to FIG. 4. FIGS. 31–33 illustrate different views of three gas turbine plants of the twin type constructed in accordance with the invention.

Referring to FIGS. 1–3, DT denotes a useful power turbine, KT a compressor turbine, K a compressor, BK a combustion chamber, RV a reduction gear, F+B a forward and backward gear, VV a heat exchanger and HJ auxiliaries. Thus, the plant according to FIG. 1 comprises a compressor turbine and a separate useful power turbine. According to FIG. 2, the plant comprises a combined compressor turbine and power turbine connected to a reduction gear for a power take-off. FIG. 3 illustrates a plant having a combined compressor and power turbine connected to a hydraulic torque converter TC which in turn is connected to a reduction gear. These three figures illustrate the outlines of gas turbine plants composed in accordance with the invention and provide with heat exchangers. However, the heat exchangers may be omitted in which case the plants may have an outer form as indicated by dotted lines.

FIGS. 4–6 illustrate in detail a further embodiment of a plant according to the invention. In accordance therewith, the plant comprises a main element in the form of a casing 1, which is symmetrical with respect to the axis of rotation and exemplified as a welded structure. Bolted to the considerably widened left-hand end of the casing, as viewed in FIG. 4a, is a compressor system which comprises a centrifugal compressor 2 having an axial inlet and a radial outlet and a compressor turbine 3 (FIG. 4b) having a radial inlet and an axial outlet. The two rotors are mounted on a common shaft 4 which extends outward to the left as viewed in FIG. 4a and is connected to a reduction gear 5 having a power take-off 6 for driving auxiliaries, such as a fuel pump, electric generators, etc.

Extending inwards from the opposite, right-hand end of the casing is a turbine unit in the form of a counter-rotation turbine (FIG. 4b). The first stage of this turbine is denoted at 7, and the appertaining rotor is mounted on a shaft 8 the inner end of which is mounted in a roller bearing 9 supported by three spokes 10 which cross the gas duct. The second stage of the counter-rotation turbine is denoted at 11 and mounted on a tubular shaft 12 which surrounds the shaft 8. The outer ends of the shafts 8 and 12 are mounted in ball bearings 13 and 14 carried by a structure which forms an endwall of the casing 1.

The compressor unit and the power turbine unit have external sealing rings 15, 16, 17 and 18, 19, respectively, in engagement with corresponding cylindrical guide surfaces on the inside of the casing 1. As a result thereof, the units are centered with respect to the casing 1, the various spaces of the plant are sealed against each other, and the units have a certain freedom of axial movement to compensate for ununiform thermal expansion. The gap between the shrouds of the two units near the sealing rings 17 and 18 is bridged by an annular plate 20 which forms part of the wall of the gas duct and is arranged such as not to obstruct relative movement of the confronting ends of the two shrouds.

The casing 1 has openings 21 for the air discharged from the compressor 2, inlet openings 22 for the admission of the products of combustion to the compressor turbine 3, and outlet openings 23 for the working gases expanded in the counter-rotation turbine 7, 11.

The casing 1 is surrounded by a sheet metal hood 24 which at its top end has a connecting flange 25 for a cover structure 26 which houses a rotary heat exchanger 27 carried by a shaft 28 which is located in a plane extending at right angles to the axis of the turbine system. The heat exchanger 27 is operated by a motor 29 driven by fluid under pressure which is delivered by a pump operated by means of the power take-off 6.

The outlet diffuser of the compressor 2 is confined by plane radial walls and has guide vanes 30 which act to maintain a certain rotary movement of the radially discharged air. The compressed air flows outwards into the interior of the sheet metal hood 24 through the openings 21 which are formed between streamlined braces or similar members. The interior of the hood 24 is consequently always filled with air at a comparatively low temperature, which as a result of the rotation during the flow through the openings 21 always will be in motion. In order to have the air move also to the right-hand end of the hood 24, as viewed in FIG. 4, the hood may be provided with plates for guiding the circulation to and fro. The compressed air passes to the upper side of the rotating heat exchanger disk 27 and vertically downward through the disk within a certain sector thereof. The air heated in the heat exchanger is collected on the lower side of the heat exchanger disk and passes through a duct 31 (FIG. 5) within the hood into a tubular combustion chamber having a cylindrical outer wall 32 which tapers toward one end and has air inlet openings 33 and forms an air jacket around the flame tube 34 so as to shield the heat exchanger from direct radiation from the combustion chamber. Primary combustion air is admitted to the flame tube through apertures 35 located behind the burner 36. In front of the burner 36 the flame tube has further apertures 37 for the supply of secondary combustion air, the apertures 37 being tangentially displaced relative to the corresponding apertures in the outer wall 32 so as to prevent direct radiation from the flame through both groups of apertures. Between the end of the flame tube and the outer wall 32 there is an annular gap 38 for the supply of additional air.

The combustion chamber merges into an inlet volute 39 which surrounds the inlet openings 22 and may consist of comparatively thin sheet metal, since the pressure prevailing outside the volute is substantially equal to the inside pressure. Similar to the air outlet openings 21 the inlet openings 22 are formed between streamlined braces which may be hollow to form ducts for cooling air. As will be seen from FIG. 12, the braces 22a form the forward parts of fixed guide vanes 40 which impart a rotary movement to the approaching gases prior to their entrance into the gas duct of the compressor turbine 3. The form and inclination of the guide vanes 40 may be modified in accordance with the design of the volute 39, one modification being shown in FIG. 12.

Figure 15:
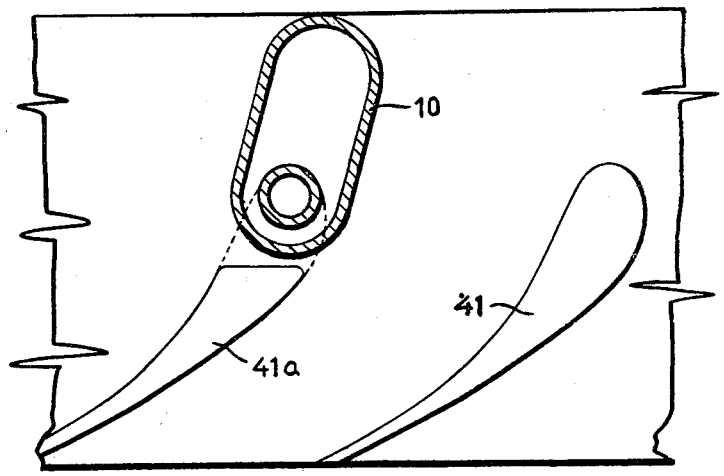
Figure 16:
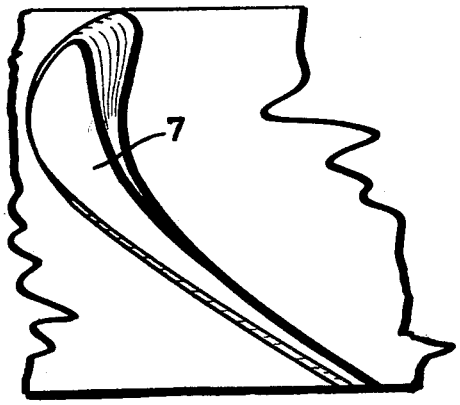

Ahead of the first set of moving blades 7 of the counter-rotation turbine there are provided guide vanes 41 (see also FIG. 15). Three guide vanes 41a have an appearance different from the other ones and are located rearwardly of the tubular spokes 10 which carry the bearing structure for the inner end of the shaft of the counter-rotation turbine. After the gases have passed the sets 7 and 11 of the turbine the blades of which are shown in FIGS. 16 and 17, the gas flow is deflected radially outwards toward the gas outlet openings 23 which are formed by streamlined braces 23a (FIG. 18). To keep together the shrouds of the power turbine there are provided at least three tubular braces 42, but additional braces 42a of suitable construction may also be provided.

To prevent detrimental heating of the inner bearing for the power turbine by the gas stream passing through the gas duct, a labyrinth-like, elastic and insulating element for the flow of cooling air therethrough may be provided between the supports and the casing of the bearing, as shown in FIGS. 30a and b. This element may be of the flame trap type.

Outside the outlet openings 23 the expanded gases are collected in an outlet volute 43 which similar to the inlet volute 39 of the compressor turbine is made of a sheet metal which however in this case is somewhat thicker on account of the external overpressure. The gases pass through a duct 44 from the lower to the upper side of the heat exchanger disk 27 and are then discharged through an outlet 45.

In order to secure a uniform distribution of the gas stream and air stream over the surface of the heat exchanger disk, guide vanes with gill-like apertures for distributing these streams may be provided on the inlet side of the disk.

From the above description it will be apparent that the gas turbine plant has no external surfaces of high temperature. The parts passed by hot gases are enclosed by the hood 24 filled with compressed air, and the top side of the heat exchanger is swept on one side by compressed air and on the other side by expanded working gases at considerably decreased temperature. The heat transferred to the compressed air from the volutes 39 and 43 and from the ducts 31 and 44 cannot be considered to be a lost heat, but is for the benefit of the plant. The outlet volute 43 may even be provided with cooling fins or similar members and may under certain conditions be devised such that the heat exchanger 27 can be entirely omitted.

Figure 11:
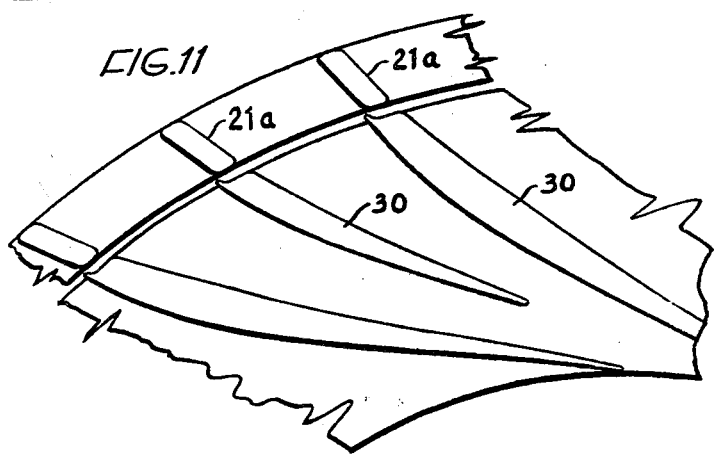

As will be seen from FIG. 11, the braces 21a forming the air outlet openings are located downstream of the blades 30 in the diffuser of the compressor.

Figure 9:
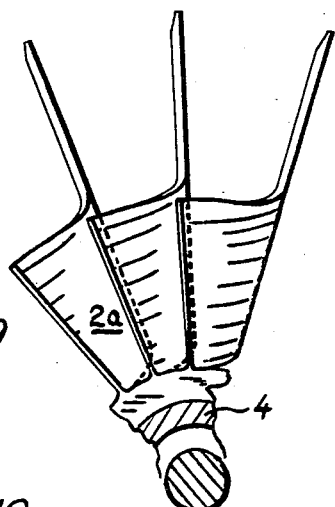
Figure 10:
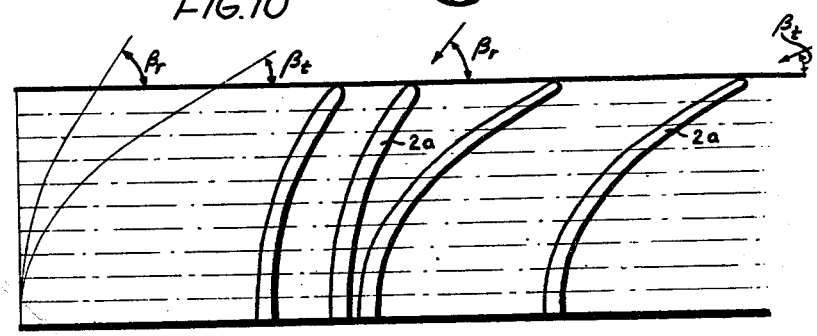
Figure 13:
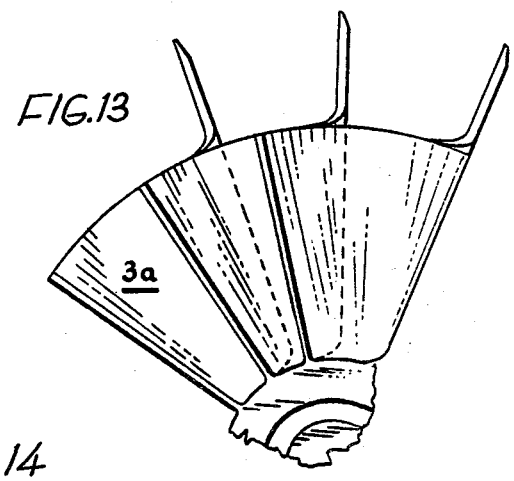
Figure 14:
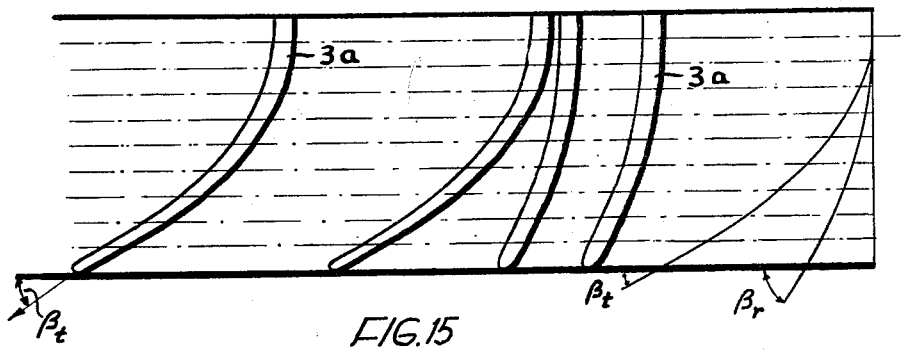

FIGS. 7 and 8 illustrate the forms of the ducts of the compressor section and turbine section, respectively, of the plant. FIG. 9 illustrates the form of the duct in the compressor wheel and the blades thereof which have separate inlet portions 2a forming a separate wheel. The shape of the inlet blades is shown in FIG. 10. In a similar manner, FIG. 13 shows the shape of the duct and blades of the compressor turbine which comprises a separate wheel with outlet blades 3a. By exchanging solely the wheels having the inlet blades 2a and the outlet blades 3a as well as the diffuser and stator sets the characteristics of the compressor system can be varied within comparatively wide ranges.

FIG. 19 illustrates the velocity diagrams for the nozzle vanes 41 and the moving blades 7 and 11 of the power turbine for five different conditions of operation. The rotor carrying the moving blades 11 rotates, to begin with, in a direction opposite to the direction of rotation of the rotor of the blades 7 while delivering a torque via a freewheel mechanism, whereas at the condition of operation indicated at III the torque of this rotor has been reduced to zero, whereupon the rotor is idling and finally comes to a rest at the condition of operation indicated at V. This mode of operation is illustrated in the diagrams shown in FIGS. 20 and 21 which illustarte the relation between speed, torque and output.

FIGS. 22 to 25 illustrate diagrammatically how the gases and the air can pass in different ways through the heat exchanger disk 27 which is composed of alternating plane and corrugated, thin metallic or ceramic strips wound onto a hub and soldered to each other to form a rigid structure which does not need spokes or similar members which would reduce the passage through the heat exchanger. Between the gas section and the air section of the heat exchanger there are provided primary sealing members PT in the form of stacks of laminar thin portions which bear on the lower side and upper side of the disk and project into radial slots so as to be readily removable for exchange, inspection, cleaning etc. To divide the gas section and air section for guiding the respective stream upward and downward through the heat exchanger disk, one side only of the disk may be provided with secondary sealing members ST of a more simple construction. Of the different embodiments illustrated in FIGS. 22 to 25 one or another one may be preferred depuending on the nature of the gas turbine plant, since they render possible variations of the arrangement of the ducts and are distinguished from each other with respect to the transfer of heat. For a gas turbine plant which mainly operates at partial load a construction is to be preferred in which the heat exchanger has its maximum efficiency just under such conditions of operation.

As shown in FIG. 4, the shaft 8 of the primary turbine 7 carries a sun gear 50 which is in mesh with three fixed planet gears 51. The shaft 12 of the secondary turbine 11 drives via a freewheel device 52 a second sun gear 53 which is in mesh with the greater portions 54 of three fixed, stepped planet gears. Each of the smaller portions 55 of the stepped planet gears is in mesh with one of the planet carriers 51 and with a ring gear 56 which is the output element of the planetary gear.

The ring gear 56 is directly connected with the sun gear 57 of a further planetary gear, said sun gear meshing with planet gears 58 mounted on a rotary planet carrier 59 which by means of splines is connected with the output shaft 60 of the gas turbine plant. The planet gears 58 are in mesh with a ring gear 61 connected to a brake element 62 adapted to be locked to a fixed brake ring 63 by means of a servo motor piston 64. Upon application of the brake 62–64 the output shaft 60 is driven in the same direction as, but at a lower speed than the sun gear 57.

The ring gear 61 is connected with the sun gear 65 of a further planetary gear the planet gears of which are denoted at 66 and the planet carrier 67 of which is connected with the output shaft 60 by means of splines. The ring gear 68 of the last-named planetary gear can be braked in a similar member as the ring gear 61, the parts of the brake device being shown at 62a, 63a and 64a.

If the brake element 62 is released and the brake element 62a is locked, the output shaft 60 will be driven at a reduced speed and in a direction opposite to the direction of rotation of the sun gear 57. As a result of the changed direction of rotation the reactive forces acting on the ring gear 68 will be considerably greater than the forces which during forward drive act upon the ring gear 61. Consequently, the brake power of the brake 62a–64a should be greater than the power of the brake 62–64. Since the mechanical designs of the brake devices are identical, the servo motor piston 64a should be acted upon by liquid at a higher pressure, for instance twice as high as the pressure acting on the piston 64. To prevent the power turbine from raising, means are provided for preventing disengagement of the power turbine during operation. Consequently, during operation the power turbine is connected with the output shaft for either forward drive or backward drive, or both brakes are applied to prevent inching. If the power turbine is not in operation, for instance when the vehicle is towed, the power turbine should be able to be disconnected.

The torque of the ring gear 56 is transmitted via a disk 69 to a tubular shaft 70 which is the input shaft of the above described forward and backward gear. On one of its sides the disk 69 has radially extending blades 71 which rotate in an annular chamber 72. This chamber is confined by a fixed radial wall 73 also provided with blades 74. When the chamber 72 is filled with a liquid, the blades 71 and 74 act as a turbo brake which can be engaged if required. To this end, liquid is supplied through hollow blades and openings, not shown, at the radially inner part of the chamber which can be emptied through openings, not shown, provided at the circumference of the chamber. The turbo brake is filled with lubricating oil for the planetary gears. In order to enable rapid filling of the chamber without interference with the supply of lubricating oil to the gears, there may be provided a pressurized oil reservoir ahead of the valve which controls the admission of oil into the chamber 72. The reservoir is charged by the lubricating oil pump during the intervals between the braking operations.

For lubricating the bearing 9 for the inner end of the shaft of the power turbine, conduits for supplying and discharging lubricating oil extend through the tubular braces 42 at the outlet of the power turbine and through the hollow spokes 10. To this end, the casing 1 which is symmetrical with respect to the axis of rotation has three outwardly projecting portions 75. Oil is supplied through a tube and discharged through another tube, and a third tube is provided for the supply of cooling and blocking air which is exhausted into the turbine duct. To prevent detrimental heating of the lubricating oil, this oil is supplied by double tubes, and cooling air passes between the two concentric tubes. The tube for the supply of air may also be shielded in a corresponding manner.

For the rest, lubricating oil is supplied through central ducts in the rotor shafts provided with radial ducts which open at the bearings to be lubricated.

As already mentioned, the details of the plant may be modified in various manners. For instance, it is possible for the compressor turbine 3 to also function as a power turbine, in which case a filler unit 76, as illustrated in FIG. 4d, is inserted at the end of casing 1 opposite that at which the compressor turbine is located. It should also be mentioned that the outlet of the compressor and/or the inlet to the compressor turbine may be provided with adjustable guide vanes which in the first-named case may be actuated simultaneously by means of a transmission provided between the compressor and the compressor turbine. An arrangement of this type is illustrated in FIGS. 28 and 29. By forming the gas duct with spherical boundary surfaces at the location of the guide vanes 41 these guide vanes, too, may be adjustable. The power turbine may be a single-stage turbine or a two-stage turbine with a unidirectional second turbine stage, in which case the reduction gear has to be changed accordingly. As shown in FIGS. 30 to 33, two complete power units may be provided in a common outer metal hood and connected to a common output shaft through a summation gear. If required, three or more power units may be provided in a corresponding manner. In this way, large combined power units are obtainable with the possibility of disconnecting one or more power units at partial load and in case of greatly varying loads. The counter-rotating turbine rotors may be mounted in journal bearings which may have floating bearing sleeves. If the two rotors are running at the same speed in opposite directions the floating sleeve will be at a standstill, resulting in a reduction of the relative bearing speed to half the relative speed in a common bearing. Cooling air may be supplied into spaces which are located near hot parts of the gas turbine plant so as to prevent detrimental heating of adjacent parts. The reduction gear may be modified as shown in FIGS. 26 and 27. In case of counter-rotation turbines a special reversing gear of the planetary type having a rotary planet carrier may be provided in combination with a freewheel device located between the planet carrier and the gear case. Further conceivable modifications need not be mentioned here.

What I claim is:

1. A gas turbine plant comprising a compressor, a first turbine driving said compressor, a combustion chamber receiving air from said compressor and producing combustion products for said first turbine, and a second turbine for producing useful power and being coaxial with said compressor and first turbine, a casing surrounding said compressor and turbines and having openings for air discharged from said compressor, inlet openings for the working gases discharged from said combustion chamber and outlet openings for the working gases expanded in said turbines, said compressor and first turbine forming a first unit and being inserted in said casing through one end thereof and said second turbine forming a second unit and being inserted in said casing through the other end of said casing, internal guide surfaces in said casing and corresponding external guide surfaces on said units for centering said units in said casing, and means for securing said units to the respective ends of the casing.

2. A gas turbine plant as claimed in claim 1, wherein the compressor and the first turbine are of the radial outward and inward flow type, respectively, the radially directed compressor outlet and turbine inlet registering with said air discharge and gas inlet openings of said casing.

3. A gas turbine plant as claimed in claim 1, wherein said second unit comprises an element forming an end wall of said casing, one end of the turbine shaft being journaled in said element and the other end of said shaft being journaled in a support inside said casing, said support being carried by spokes crossing the turbine inlet duct within a zone at a portion of the second unit centered by guide surfaces.

4. A gas turbine plant as claimed in claim 3 wherein the endwall which carries bearings for the rotor of the power turbine is secured to an axially outwardly projecting case of a reduction gear which case carries the case of a forward and backward gear the output shaft of which is the output shaft of the gas turbine plant.

5. A gas turbine plant as claimed in claim 4 wherein the power turbine is a counter-rotation turbine and wherein the reduction gear is a combined reduction and reversing gear.

6. A gas turbine plant as claimed in claim 5 wherein even the forward and backward gear is adapted to reduce the speed and wherein between said gear and the reduction gear there is provided a hydraulic turbo brake the working medium of which is the lubricating oil for the gears.

7. A gas turbine plant as claimed in claim 1 wherein sealing rings are provided between the internal guide surfaces of the casing and corresponding guide surfaces of the units inserted into the casing.

8. A gas turbine plant as claimed in claim 1 wherein the spokes constitute at least parts of guide vanes in the turbine inlet duct.

9. A gas turbine plant as claimed in claim 1 wherein around the casing there is provided a hood formed from sheet metal and surrounding at least part of the casing, the interior of said hood being in direct communication with the openings for the compressed air and enclosing said combustion chamber and wherein said combustion chamber communicates with an inlet volute for the compressor turbine, said volute being located outside the gas inlet openings of the casing.

10. A gas turbine plant as claimed in claim 9 wherein the combustion chamber is tubular with its longitudinal axis substantially in alignment with the longitudinal axis of the intake part of the volute.

11. A gas turbine plant as claimed in claim 9 wherein the hood also encloses a heat exchanger adapted to be passed by the products of combustion discharged through the gas outlet openings of the casing and by compressed air prior to the entrance thereof into the combustion chamber, and wherein around the gas outlet openings there is provided an outlet volute which through a conduit provided in the casing communicates with the heat exchanger which in turn communicates with an outlet for the products of combustion, the air outlet from the heat exchanger communicating with the combustion chamber through a duct which shields the heated air from the interior of the hood.

12. A gas turbine plant as claimed in claim 11 wherein the heat exchanger is of the rotary type and housed in a cover detachably secured to the hood.

13. A gas turbine plant as claimed in claim 1 wherein the power turbine is a unidirectional turbine.

14. A gas turbine plant as claimed in claim 1 wherein the power turbine has two sets of moving blades for rotation in the same direction and carried by separate rotors which are interconnected by means of a summation gear.

15. A gas turbine plant comprising a compressor, a turbine driving said compressor, a combustion chamber receiving air from said compressor and producing combustion products for said turbine, a casing surrounding said compressor and turbine and having openings for air discharged from said compressor, inlet openings for the working gases discharged from said combustion chamber and outlet openings for the working gases expanded in said turbine, said compressor and turbine forming a first unit and being inserted in said casing through one end thereof, a second unit comprising a filling member and being inserted in said casing through the other end thereof, said filling member being shaped such as to guide the expanded gases leaving said turbine to the gas outlet openings of said casing, internal guide surfaces in said casing and corresponding external guide surfaces on said units for centering said units in said casing, and output shaft, and a reduction gear drivingly connecting said first unit to said output shaft.

References Cited by the Examiner

UNITED STATES PATENTS

| | | | |
|---|---|---|---|
| 2,738,647 | 3/56 | Hill | 60—39.31 |
| 2,795,928 | 6/57 | Huebner et al. | 60—39.51 |
| 2,852,912 | 9/58 | Kelley | 60—39.16 |
| 3,088,278 | 5/63 | Franz | 60—39.16 |

FOREIGN PATENTS 1,262,452  4/61  France.

SAMUEL LEVINE, *Primary Examiner.*

JULIUS E. WEST, *Examiner.*